United States Patent
Park et al.

(10) Patent No.: US 9,929,833 B2
(45) Date of Patent: Mar. 27, 2018

(54) METHOD FOR TRANSMITTING A HARQ FEEDBACK AND DEVICE THEREFOR

(71) Applicant: LG Electronics Inc., Seoul (KR)

(72) Inventors: Sungjun Park, Seoul (KR); Sunyoung Lee, Seoul (KR); Sunghoon Jung, Seoul (KR); Youngdae Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 14/773,018

(22) PCT Filed: Feb. 11, 2014

(86) PCT No.: PCT/KR2014/001111
§ 371 (c)(1),
(2) Date: Sep. 4, 2015

(87) PCT Pub. No.: WO2014/137079
PCT Pub. Date: Sep. 12, 2014

(65) Prior Publication Data
US 2016/0020873 A1    Jan. 21, 2016

Related U.S. Application Data

(60) Provisional application No. 61/774,588, filed on Mar. 8, 2013.

(51) Int. Cl.
*H04J 3/00* (2006.01)
*H04L 1/18* (2006.01)
(Continued)

(52) U.S. Cl.
CPC .......... *H04L 1/1822* (2013.01); *H04L 1/1854* (2013.01); *H04W 72/0446* (2013.01);
(Continued)

(58) Field of Classification Search
CPC ............... H04L 1/1822; H04L 1/1854; H04W 72/0446; H04W 88/02
See application file for complete search history.

(56) References Cited

U.S. PATENT DOCUMENTS

2011/0075611 A1* 3/2011 Choi ................... H04L 1/1819
370/329
2011/0194499 A1* 8/2011 Aiba .................... H04L 1/1822
370/328
(Continued)

FOREIGN PATENT DOCUMENTS

WO     2012127591     9/2012

*Primary Examiner* — Derrick Ferris
*Assistant Examiner* — Farhad Ali
(74) *Attorney, Agent, or Firm* — Dentons US LLP

(57) ABSTRACT

The present invention relates to a wireless communication system. More specifically, the present invention relates to a method and a device for transmitting a HARQ (Hybird-ARQ) feedback signal in the wireless communication system, wherein the method comprises: receiving 1st to ith data within a time window comprising subframes 1 to N, wherein the 1st to Nth data are transmitted by a base station for the time window, wherein the 'i' is a natural number no more than the 'N', and the 1st to the Nth data are the same, sequentially decoding the 1st to the ith data, wherein the ith data received at a subframe i is data first successfully decoded, and transmitting an ACK (Acknowledgement) signal for all the 1st to the Nth data at a subframe i+X, wherein the 'X' is a predetermined number for transmission of the HARQ signal.

12 Claims, 10 Drawing Sheets

(51) Int. Cl.
*H04W 72/04* (2009.01)
*H04W 88/02* (2009.01)
*H04W 88/08* (2009.01)

(52) U.S. Cl.
CPC .......... *H04L 1/1825* (2013.01); *H04L 1/1887* (2013.01); *H04W 88/02* (2013.01); *H04W 88/08* (2013.01)

(56) References Cited

U.S. PATENT DOCUMENTS

| | | |
|---|---|---|
| 2012/0008580 A1 | 1/2012 | Lee et al. |
| 2012/0113925 A1 | 5/2012 | Ahn et al. |
| 2014/0003374 A1* | 1/2014 | Kuo .................... H04L 1/1896 370/329 |

* cited by examiner

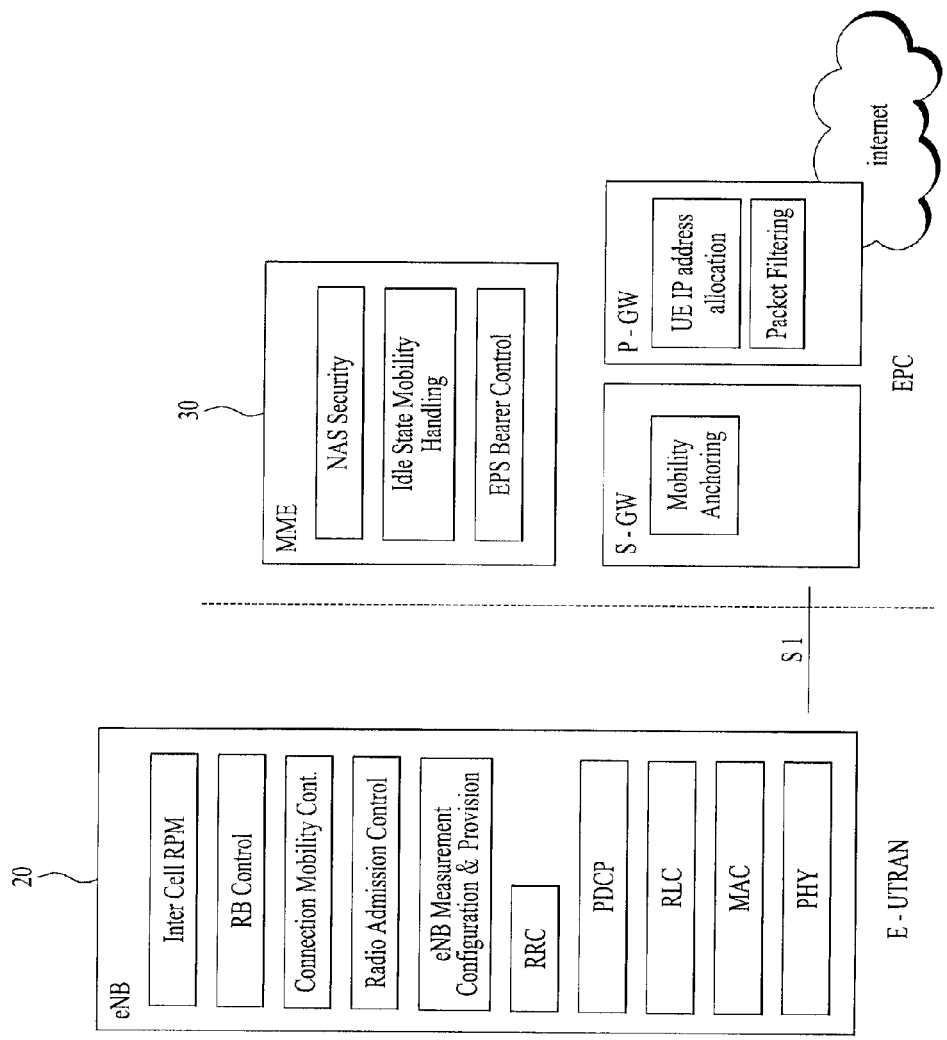

(a) contol - plane protocol stack (b) user - plane protocol stack

No FB = No Feedback
sb = subframe
Data 1 and Data 2 are the same data ive in the future. Decrease in cost per bit, increase in service availability, flexible use of frequency bands, a simplified structure, an open interface, appropriate power consumption of UEs, and the like are required.

METHOD FOR TRANSMITTING A HARQ FEEDBACK AND DEVICE THEREFOR

This application is a 35 USC § 371 National Stage entry of International Application No. PCT/KR2014/001111 filed on Feb. 11, 2014, and claims priority to U.S. Provisional Application No. 61/774,588 filed on Mar. 8, 2013, all of which are hereby incorporated by reference in their entireties as if fully set forth herein.

TECHNICAL FIELD

The present invention relates to a wireless communication system and, more particularly, to a method for transmitting a HARQ feedback and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competi-

DISCLOSURE

Technical Problem

An object of the present invention devised to solve the problem lies in a method and device for efficiently transmitting a HARQ feedback in a wireless communication system. The technical problems solved by the present invention are not limited to the above technical problems and those skilled in the art may understand other technical problems from the following description.

Technical Solution

The object of the present invention can be achieved by providing a method for transmitting a HARQ (Hybird-ARQ) feedback signal at a UE (User Equipment) in the wireless communication system, the method comprising: receiving 1st to ith data within a time window comprising subframes 1 to N, wherein the 1st to Nth data are transmitted by a base station for the time window, wherein the is a natural number no more than the 'N', and the 1st to the Nth data are the same; sequentially decoding the 1st to the ith data, wherein the ith data received at a subframe i is data first successfully decoded; and transmitting an ACK (Acknowledgement) signal for all the 1st to the Nth data at a subframe i+X, wherein the 'X' is a predetermined number for transmission of the HARQ signal.

In another aspect of the present invention, provided herein is a UE (User Equipment) for transmitting a HARQ (Hybird-ARQ) feedback signal in the wireless communication system, the UE comprising: an RF module; and a processor to control the RF module, wherein the processor configured to receive 1st to ith data within a time window comprising subframes 1 to N, wherein the 1st to Nth data are transmitted by a base station for the time window, wherein the 'i' is a natural number no more than the 'N', and the 1st to the Nth data are the same, to sequentially decode the 1st to the ith data, wherein the ith data received at a subframe i is data first successfully decoded, and to transmit an ACK (Acknowledgement) signal for all the 1st to the Nth data at a subframe i+X, wherein the 'X' is a predetermined number for transmission of the HARQ signal.

Preferably, no HARQ feedback signal for the 1st to the (i−1)th data is transmitted.

Preferably, (i+1)th data to the Nth data are not decoded when the ACK signal for all the 1st to the Nth data is transmitted.

Preferably, $(i+1)^{th}$ data to the $N^{th}$ data are not received when the ACK signal for all the $1^{st}$ to the $N^{th}$ data is transmitted.

Preferably, $(i+1)^{th}$ data to the $N^{th}$ data are received but not decoded when the ACK signal for all the 1st to the Nth data is transmitted.

Preferably, a length of the time window is configured by RRC signaling or MAC signaling, and the length of the time window is set per a HARQ process, or per each UE including the UE.

Preferably, the UE identifies the 1st to the Nth data are the same if the 1st to the Nth data are for all the same HARQ process and 2nd to the Nth data are indicated with not toggled NDI.

Advantageous Effects

According to the present invention, channel information can be efficiently transmitted in a wireless communication system. Specifically, a HARQ feedback transmission can be efficiently transmitted.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2B is a block diagram depicting architecture of a typical E-UTRAN and a typical EPC;

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
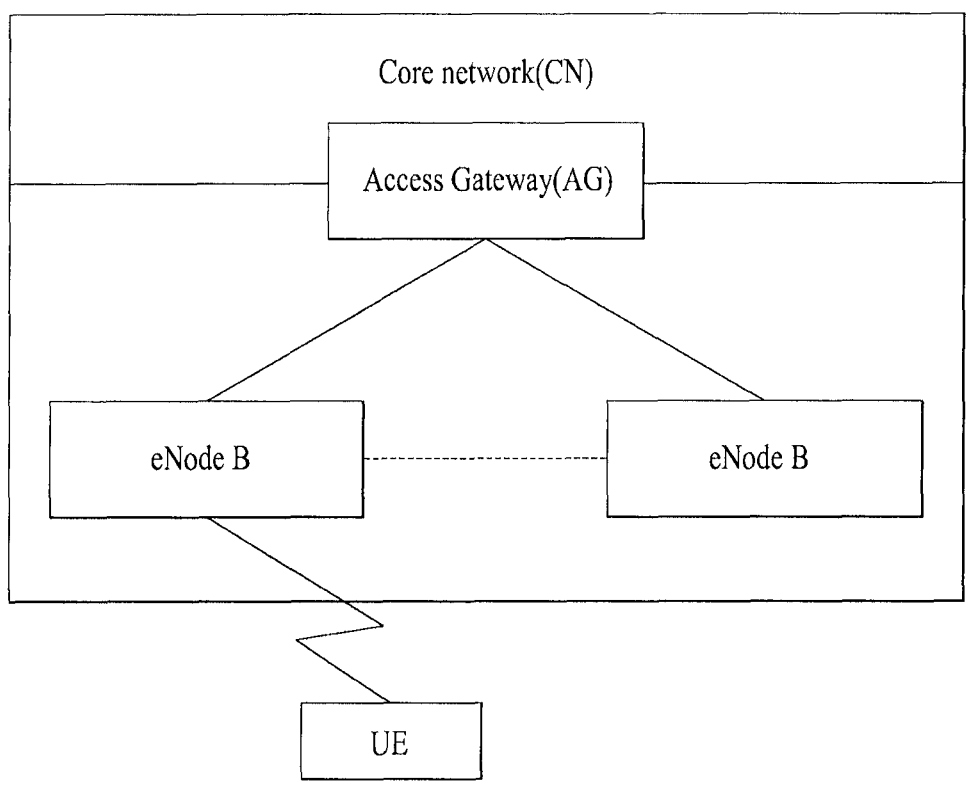
FIG. 1 is a diagram showing a network structure of an Evolved Universal Mobile Telecommunications System (E-UMTS) as an example of a wireless communication system.
Figure 2A:
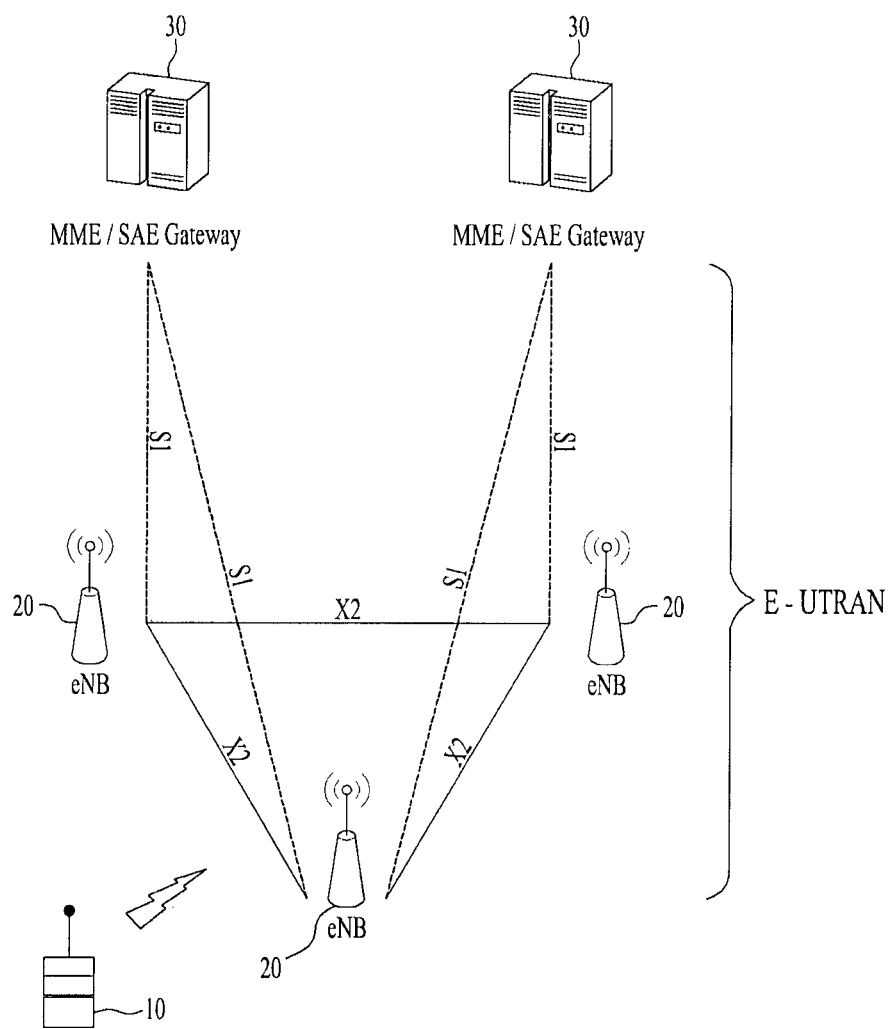
FIG. 2A is a block diagram illustrating network structure of an evolved universal mobile telecommunication system (E-UMTS).

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBRFor clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 3:
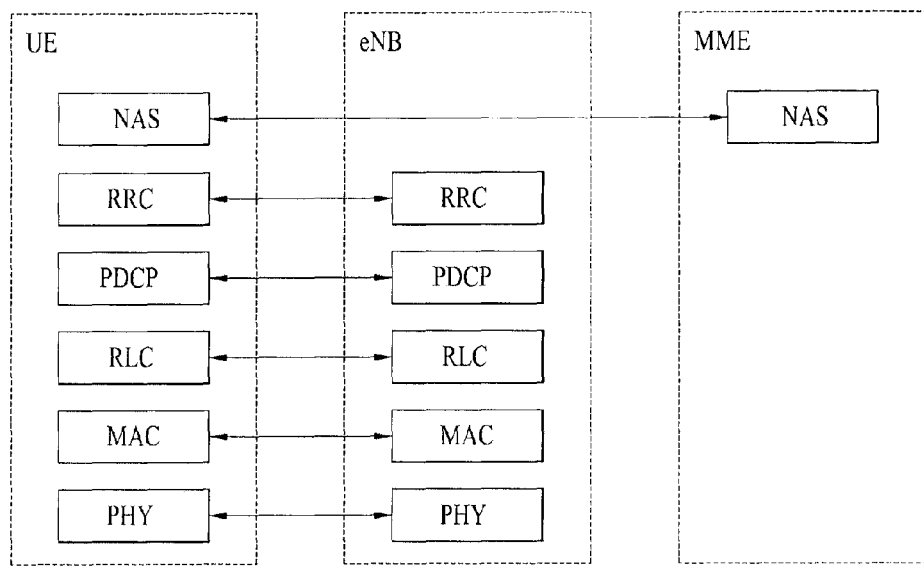
FIG. 3 is a diagram showing a control plane and a user plane of a radio interface protocol between a UE and an E-UTRAN based on a 3rd generation partnership project (3GPP) radio access network standard.
Figure 3:
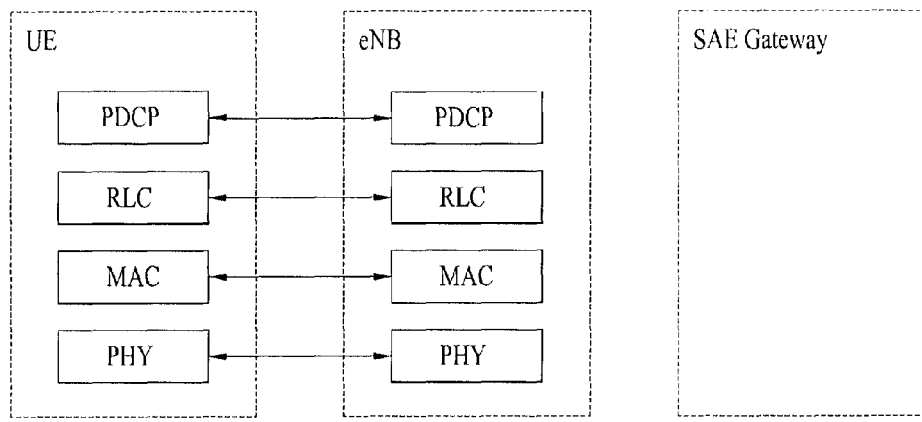

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
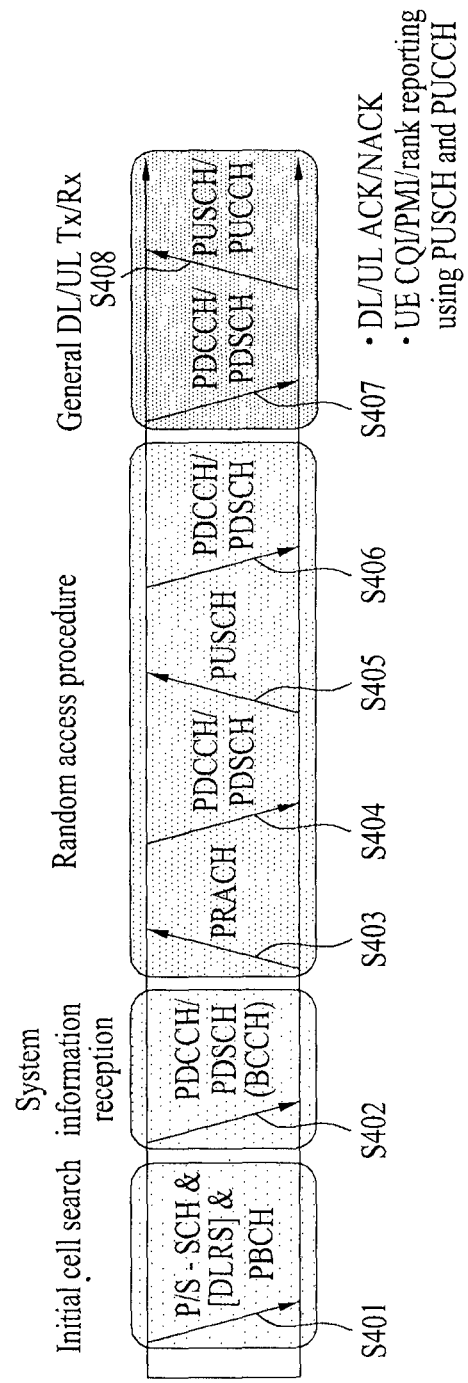
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
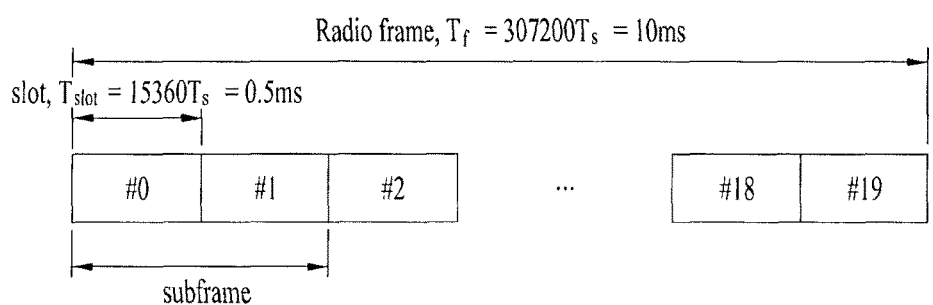
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms (327200×Ts) and is divided into 10 subframes having the same size. Each of the subframes has a length of 1 ms and includes two slots. Each of the slots has a length of 0.5 ms (15360×Ts). Ts denotes a sampling time, and is represented by Ts=1/(15 kHz×2048)=3.2552×10−8 (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Hereinafter, an RRC state of a UE and an RRC connection method will be described.

The RRC state indicates whether the RRC layer of the UE is logically connected to the RRC layer of the E-UTRAN. When the RRC connection is established, the UE is in a RRC_CONNECTED state. Otherwise, the UE is in a RRC_IDLE state.

The E-UTRAN can effectively control UEs because it can check the presence of RRC_CONNECTED UEs on a cell basis. On the other hand, the E-UTRAN cannot check the presence of RRC_IDLE UEs on a cell basis and thus a CN manages RRC_IDLE UEs on a TA basis. A TA is an area unit larger than a cell. That is, in order to receive a service such as a voice service or a data service from a cell, the UE needs to transition to the RRC_CONNECTED state.

In particular, when a user initially turns a UE on, the UE first searches for an appropriate cell and camps on the cell in the RRC_IDLE state. The RRC_IDLE UE transitions to the RRC_CONNECTED state by performing an RRC connection establishment procedure only when the RRC_IDLE UE needs to establish an RRC connection. For example, when uplink data transmission is necessary due to call connection attempt of a user or when a response message is transmitted in response to a paging message received from the E-UTRAN, the RRC_IDLE UE needs to be RRC connected to the E-UTRAN.

Figure 6:
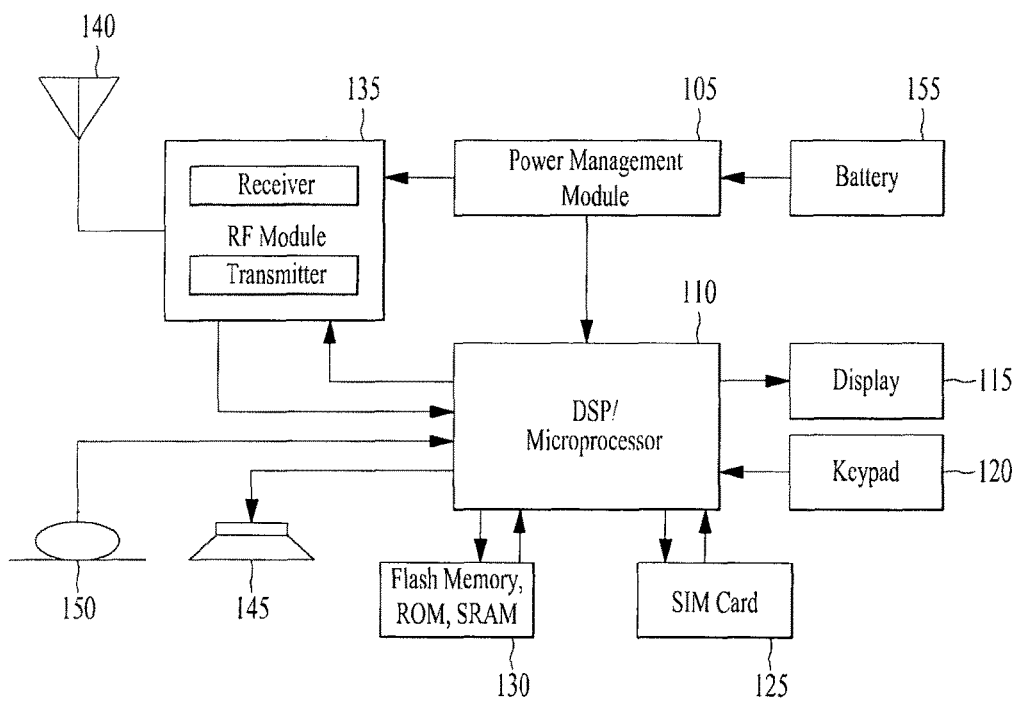
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB adapted to perform the above mechanism, but it can be any apparatus for performing the same operation.

As shown in FIG. 6, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Figure 7:
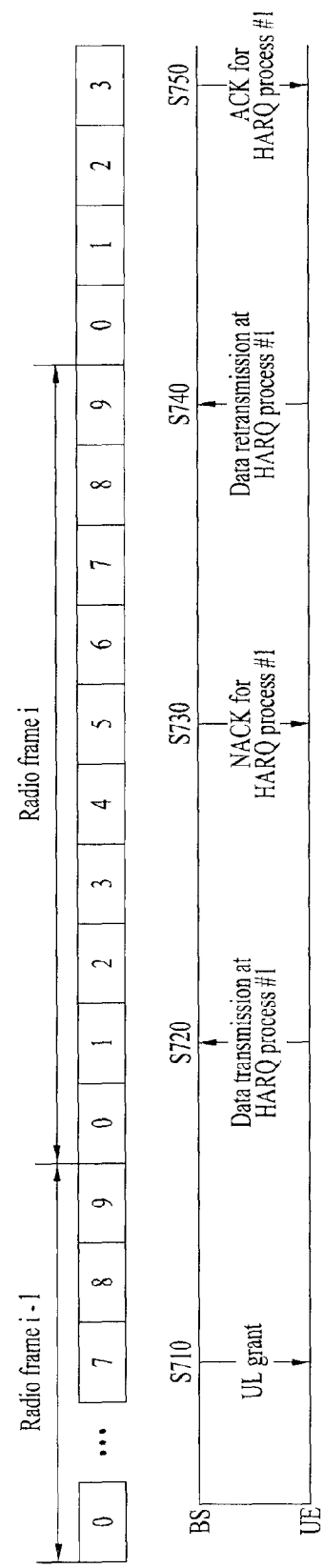
FIG. 7 is a conceptual diagram illustrating an exemplary synchronous non-adaptive UL HARQ operation.

FIG. 7 is a conceptual diagram illustrating an exemplary synchronous non-adaptive UL HARQ operation.

Referring to FIG. 7, a user equipment (UE) has a plurality of HARQ processes, and the HARQ processes may operate in a synchronous manner. That is, each HARQ process may be allocated to each TTI in a synchronous manner. For example, the LTE system assumes that the UE has 8 HARQ processes. As a result, HARQ process #1 may be allocated to the first TTI, HARQ process #2 may be allocated to the second TTI, HARQ process #8 may be allocated to the 8th TTI, HARQ process #1 may be allocated to a 9th TTI, and HARQ process #2 may be allocated to the 10th TTI. For example, if a PDCCH including a UL grant is detected at a specific TTI, the HARQ entity can identify the HARQ process in which data transmission should be carried out, and can transfer UL grant information to the identified HARQ process. For example, as can be seen from FIG. 7, if the HARQ process associated with Subframe #7 of a radio frame (i−1) having received the UL grant is set to 1, UL data may be transmitted at HARQ process #1 at Subframe #1 of the radio frame (i) and may be retransmitted at HARQ process #1 at Subframe #9 of the radio frame (i) after lapse of 8 subframes. In a synchronous HARQ operation, if HARQ process associated with one TTI is identified, it can be recognized that the same HARQ process is associated at the corresponding TTI (TTI+8). If a certain HARQ process is associated with one TTI during the synchronous HARQ operation unless otherwise mentioned, it is assumed that the same HARQ process is associated with the 8th, 16th, and 24th TTIs after lapse of the corresponding TTI.

In step S710, the BS (or eNB) may transmit a UL grant to the UE, such that the UE may flush a Tx buffer and store new UL data in the Tx buffer. In step S720, the UE may transmit UL data to the BS (or eNB) at HARQ process #1 on the basis of resources and MCS information in response to the UL grant received at step S710. In this example, it is assumed that UL data received by the BS (or eNB) fails in decoding, such that the BS (or eNB) may transmit the NACK message in response to UL data in step S730. Upon receiving the NACK message from the BS (or eNB), the UE may retransmit the previously transmitted UL data in step S740. In this case, retransmission may be carried out at HARQ process #1 in which UL data transmission has been carried out at step S720, and the retransmission may be carried out at intervals of 8 msec. That is, a time point at which retransmission is carried out is not separately designated, and the retransmission is carried out at intervals of a predetermined time, such that this operation may correspond to a synchronous HARQ operation. In addition, the UE having received the NACK message may apply resources, MCS level, etc. designated by the previously received UL grant to retransmission without change, without receiving a separated UL grant. That is, new scheduling information for retransmission is not given, and may correspond to the non-adaptive HARQ operation. The BS having received the retransmitted UL data combines the retransmitted UL data with the previously received data, and attempts to decode the combined result. In this example, it is assumed that the BS succeeds in reception and decoding of UL data. In this case, the BS may transmit the ACK message to the UE in step S750. Although FIG. 7 assumes a uplink (UL) situation in which the UE is a data transmitter, the BS is a data receiver, and the UE receives HARQ feedback information from the UE for convenience of description and better understanding of the present invention, the HARQ operation may be carried out even in the case in which the BS transmits DL data and the UE feeds back ACK/NACK information.

The HARQ scheme may be classified into a synchronous scheme and an asynchronous scheme on the basis of a retransmission time. In accordance with the synchronous HARQ scheme, if initial transmission failure occurs, subsequent retransmission may be carried out at a specific time decided by the system as the above FIG. 7. On the contrary, according to the asynchronous HARQ scheme, information regarding the retransmission time may be scheduled separately. Therefore, the retransmission time of the packet corresponding to the NACK signal may be changed by various conditions such as a channel state, etc.

In LTE(-A) system, when the UE transmit UL data to the BS (in case of UL HARQ process), the BS may transmit ACK/NACK signals at the certain time point and retransmission is carried out at intervals of a predetermined time, such that this operation may correspond to a synchronous HARQ operation. On the other hand, when the BS transmits DL data to the UE (in case of DL HARQ process), the UE may transmit ACK/NACK signals based on information included in the DCI indicating an asynchronous DL HARQ operation.

Regarding the formats of control information, control information transmitted on a PDCCH is called DCI. The configuration of information carried in PDCCH payload may be changed depending on DCI format. The PDCCH payload is information bits. Table 1 lists DCI according to DCI formats.

TABLE 1

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 1, the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of transmission power control (TPC) commands for uplink channels. DCI Format 1A is available for PDSCH scheduling irrespective of the transmission mode of a UE.

Especially, DCI format 1 used for the scheduling of one PDSCH includes the following information. Table 2 lists the information included on the DCT format 1.

TABLE 2

| Information | bits |
| --- | --- |
| Resource allocation header | 1 bit |
| Resource block assignment | $\lceil N_{RB}^{DL}/P \rceil$ bits or ($\lceil N_{RB}^{DL}/P \rceil - \lceil \log_2(P) \rceil - 1$) bits |
| Modulation and coding scheme | 5 bits |
| HARQ process number | 3 bits (FDD), 4 bits (TDD) |
| New data indicator | 1 bit |
| Redundancy version | 2 bits |
| TPC command for PUCCH | 2 bits |
| Downlink Assignment Index | 2 bits |

Referring to Table 2, in case of a DL HARQ process, the DCI transmitted via the format 1 explicitly indicates HARQ process number. In according to the asynchronous HARQ scheme, the transmission of the ACK/NACK signal and the retransmission time of the packet corresponding to the NACK signal may be configured by the information regarding to the HARQ process number.

Figure 8:
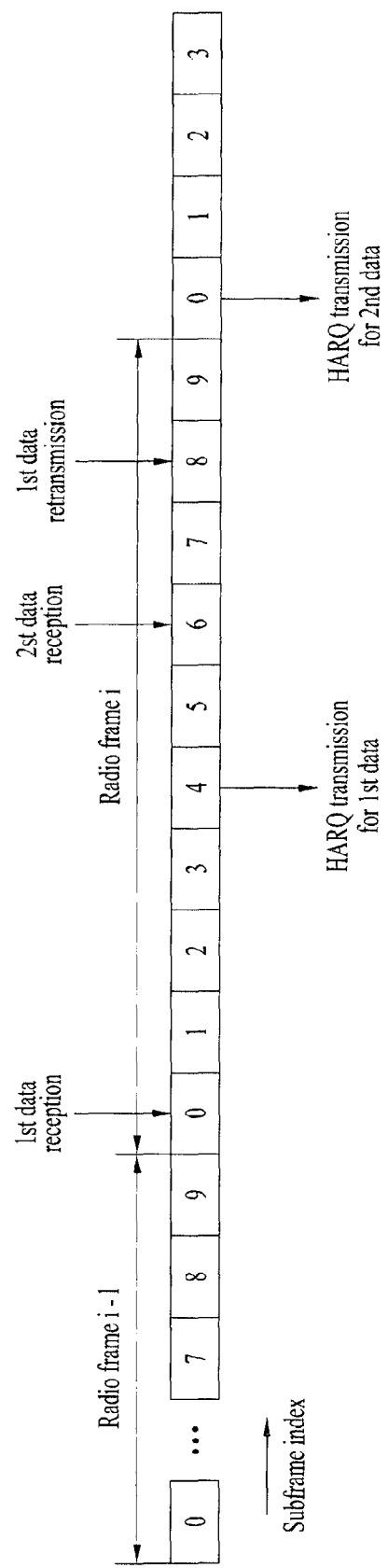
FIG. 8 is a conceptual diagram illustrating an HARQ operation in LTE system when a plurality of same data are received in a specific time window.

FIG. 8 is a conceptual diagram illustrating an HARQ operation in LTE system when a plurality of same data are received in a specific time window.

In LTE, HARQ RTT (Round Trip Time) is defined as 8 ms (for FDD) and more (for TDD), and considered as minimum time until a HARQ retransmission takes place. However, it is likely that some UEs are capable of receiving the HARQ retransmissions before HARQ RTT. In this case, the eNB may schedule the HARQ retransmission earlier without waiting HARQ RTT.

Regarding FIG. 8, when the eNB schedules data for an initial transmission at subframe n and for a retransmission at subframe n+x, the UE decodes the data received at subframe n and sends a HARQ feedback according to the decoding result at subframe n+4 and the UE decodes the data received at subframe n+x and sends a HARQ feedback according to the decoding result at subframe n+x+4. Herein the x is considered as 1 ms<=x<=7 ms.

If the n=0 and the x is 6, the UE decodes the first data received at subframe 0 and sends a HARQ feedback according to the first data decoding result at subframe 4. The UE decodes the second data received at subframe 6 and sends a HARQ feedback according to the second data decoding result at subframe 10. And the UE received re-transmission of the first data at subframe 8 when the HARQ feedback according to the first data indicated as a NACK signal.

In this manner, when the first data is not successfully decoded, the HARQ feedback according to the second data is necessary because the HARQ feedback according to the second data is earlier than a HARQ feedback according to re-transmission of the first data. However, when the first data is successfully decoded, the HARQ feedback according to the first data is transmitted at subframe 4 as ACK signaling. In this case, the HARQ feedback according to the second data may be unnecessary.

As seen above, because the UE has to send HARQ feedbacks for each of data, some HARQ feedbacks may be unnecessary if the each of data are the same, and would causes waste of radio resources and UE power consumption.

Figure 9:
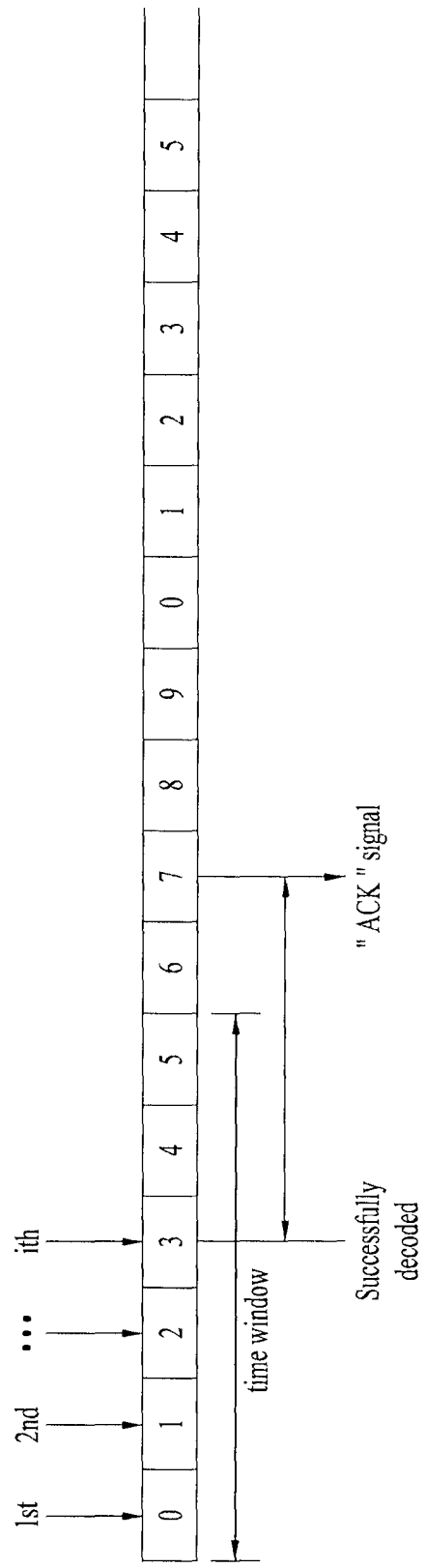
FIGS. 9 to 10 are a conceptual diagram illustrating an HARQ operation according to embodiments of the present invention.

FIG. 9 is a conceptual diagram illustrating an HARQ operation according to embodiments of the present invention.

In this invention, when a UE receives the same data in a pre-defined time window, the UE sends one HARQ feedback for all the data received in the pre-defined time window (e.g. downlink TTI bundling). The UE may be configured with the length of the pre-defined time window by RRC or MAC signaling. Or, the length of the pre-defined time window can be set to a fixed value.

The length of pre-defined time window can be set per HARQ process, or per UE.

The pre-defined time window may start from the subframe where the data is received. Or, data may be received outside of the pre-defined time window.

The same data means the data that is intended for the same HARQ process and is indicated with not toggled NDI. For example, the UE receives data for a HARQ process "X" and receives another data for the HARQ process "X". The latter data is indicated with not toggled NDI. Then, the former data and latter data are considered as the same data.

If any of the data received in the pre-defined time window is successfully decoded by the UE, the UE sends the HARQ feedback (ACK) based on the reception time of the received data (within the pre-defined time window) that is successfully decoded first.

For example, the UE receives $1^{st}$ to $i^{th}$ data within the time window comprising subframes 1 to N, wherein the $1^{st}$ to $N^{th}$ data are transmitted by the base station for the time window, wherein the 'i' is a natural number no more than the 'N', and the $1^{st}$ to the $N^{th}$ data are the same. If the $1^{st}$ to the $N^{th}$ data have all same HARQ process and $2^{nd}$ to the $N^{th}$ data are indicated with not toggled NDI, the $1^{st}$ to the $N^{th}$ data are the same. When the UE decodes the $i^{th}$ data is successfully decoded first among the $1^{st}$ to the $i^{th}$ data, the UE transmits an ACK signal for all the $1^{st}$ to the $N^{th}$ data at a subframe i+X, wherein the 'X' is a predetermined number for transmission of the HARQ signal (e.g. X=4).

Until finding the first successfully decoded data ($i^{th}$ data), no HARQ feedback signal for the $1^{st}$ to the $(i-1)^{th}$ data is transmitted. And when the ACK signal for all the $1^{st}$ to the $N^{th}$ data is transmitted, $(i+1)^{th}$ data to the $N^{th}$ data are not decoded, the $(i+1)^{th}$ data to the $N^{th}$ data not transmitted or the $(i+1)^{th}$ data to the $N^{th}$ data are not transmitted and not decoded.

Alternatively, the time that UE sends a HARQ feedback when the UE is configured with the pre-defined time window can be configurable by the eNB. For example, if the end of the pre-defined time window is N, it is possible that the UE sends a HARQ feedback N+x. x can be a configurable value or a fixed value.

Figure 10:
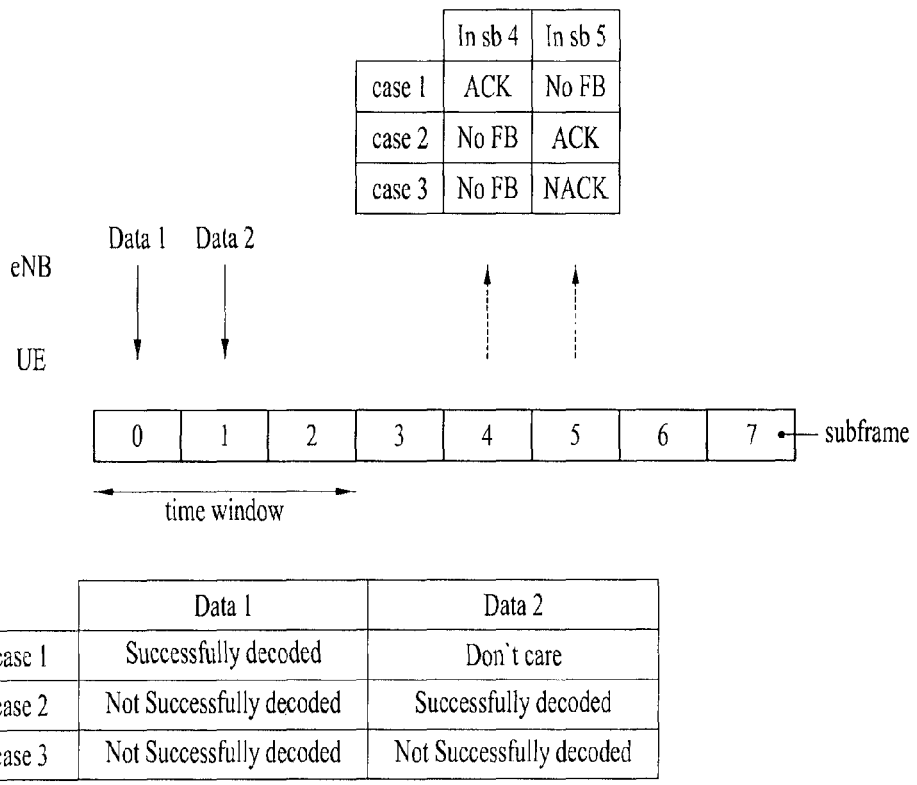

FIG. 10 is a conceptual diagram illustrating an HARQ operation according to embodiments of the present invention.

For example, the time window is assumed to be subframe 0 to 2. The UE receives data 1 in subframe 0 and data 2 in subframe 1. Data 1 and data 2 are the same data. The UE successfully decode data 1 and data 2 (case 1). Because data 1 is the first received data that is successfully decoded, the UE sends HARQ ACK in subframe 4 according to the reception time of data 1. Because there is one HARQ feedback for all the data received in the time window, the UE does not sends HARQ feedback in subframe 6. In this case, regardless of whether the data 2 is successfully decoded or not, the UE does not send a HARQ feedback.

If all the received in the time window are not successfully decoded by the UE, the UE sends the HARQ feedback (i.e., HARQ NACK) based on the reception time of the last received data (within the time window) that is not successfully decoded. For example, the UE does not successfully decode data 1 and data 2 (case 3). Because data 2 is the last received data that is not successfully decoded, the UE sends HARQ NACK in subframe 6 according to the reception time of data 2. Because there is one HARQ feedback for all the data received in the time window, the UE does not sends HARQ feedback in subframe 4. And where data 1 is not successfully decoded while data 2 is successfully decoded (case 2), the UE sends a HARQ ACK in subframe 5. In this case, the UE does not send a HARQ feedback in subframe 4.

Figure 11:
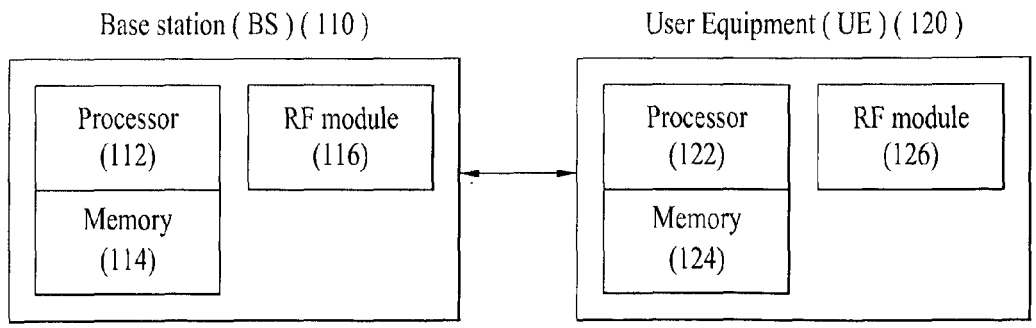
FIG. 11 is illustrating of a BS, a relay and a UE applicable to an embodiment of the present invention.

FIG. 11 illustrates a BS, a relay and a UE applicable to an embodiment of the present invention.

Referring to FIG. 11, a wireless communication system includes a base station (BS) 110, a relay (RN) 130 and a UE 130. While FIG. 11 illustrates the UE connected to the relay, the UE may be connected to the BS.

The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The relay 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The UE 130 includes a processor 132, a memory 134 and an RF unit 136. The processor 132 may be configured to implement the procedures and/or methods proposed by the present invention. The memory 134 is connected to the processor 132 and stores various types of information relating to operations of the processor 132. The RF unit 136 is connected to the processor 132 and transmits and/or receives RF signals. The BS 110, relay 120 and UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for transmitting a Hybrid Automatic Repeat Request (HARQ) feedback signal at a User Equipment (UE) in a wireless communication system, the method comprising:
  receiving $1^{st}$ to $i^{th}$ data within a time window comprising subframes 1 to N, wherein $1^{st}$ to $N^{th}$ data are transmitted by a base station for the time window, wherein i is a natural number less than N, and the $1^{st}$ to the $N^{th}$ data are the same;
  sequentially decoding the $1^{st}$ to the $i^{th}$ data, wherein the $i^{th}$ data received at a subframe i is data first successfully decoded; and
  transmitting an Acknowledgement (ACK) signal for all the $1^{st}$ to the $N^{th}$ data at a subframe i+X, wherein X is a predetermined number for transmission of the HARQ signal, and
  wherein $(i+1)^{th}$ data to the $N^{th}$ data are received but not decoded when the ACK signal for all the $1^{st}$ to the $N^{th}$ data is transmitted.

2. The method of claim 1, wherein no HARQ feedback signal for the $1^{st}$ to the $(i-1)^{th}$ data is transmitted.

3. The method of claim 1, wherein $(i+1)^{th}$ data to the $N^{th}$ data are not decoded when the ACK signal for all the $1^{st}$ to the $N^{th}$ data is transmitted.

4. The method of claim 1, wherein $(i+1)^{th}$ data to the $N^{th}$ data are not received when the ACK signal for all the $1^{st}$ to the $N^{th}$ data is transmitted.

5. The method of claim 1, wherein a length of the time window is configured by Radio Resource Control (RRC) signaling or Media Access Control (MAC) signaling, and the length of the time window is set per a HARQ process, or per each UE including the UE.

6. The method of claim 1, wherein the UE identifies the $1^{st}$ to the $N^{th}$ data are the same if the $1^{st}$ to the $N^{th}$ data are for all the same HARQ process and $2^{nd}$ to the $N^{th}$ data are indicated with not toggled New Data Indicator (NDI).

7. A User Equipment (UE) for transmitting a Hybrid Automatic Repeat Request (HARQ) feedback signal in a wireless communication system, the UE comprising:
  an RF module; and
  a processor that:
    controls the RF module to receive $1^{st}$ to $i^{th}$ data within a time window comprising subframes 1 to N, wherein $1^{st}$ to $N^{th}$ data are transmitted by a base station for the time window, wherein i is a natural number less than N, and the $1^{st}$ to the $N^{th}$ data are the same,
    sequentially decodes the $1^{st}$ to the $i^{th}$ data, wherein the $i^{th}$ data received at a subframe i is data first successfully decoded, and
    controls the RF module to transmit an Acknowledgement (ACK) signal for all the $1^{st}$ to the $N^{th}$ data at a subframe i+X, wherein X is a predetermined number for transmission of the HARQ signal, and
    wherein $(i+1)^{th}$ data to the $N^{th}$ data are received but not decoded when the ACK signal for all the $1^{st}$ to the $N^{th}$ data is transmitted.

8. The UE of claim 7, wherein no HARQ feedback signal for the $1^{st}$ to the $(i-1)^{th}$ data is transmitted.

9. The UE of claim 7, wherein the processor does not decode $(i+1)^{th}$ data to the $N^{th}$ data when the ACK signal for all the $1^{st}$ to the $N^{th}$ data is transmitted.

10. The UE of claim 7, wherein the RF module does not receive $(i+1)^{th}$ data to the $N^{th}$ data when the ACK signal for all the $1^{st}$ to the $N^{th}$ data is transmitted.

11. The UE of claim 7, wherein a length of the time window is configured by Radio Resource Control (RRC) signaling or Media Access Control (MAC) signaling, and the length of the time window is set per a HARQ process, or per each UE including the UE.

12. The UE of claim 7, wherein the UE identifies the $1^{st}$ to the $N^{th}$ data are the same if the $1^{st}$ to the $N^{th}$ data are for all the same HARQ process and $2^{nd}$ to the $N^{th}$ data are indicated with not toggled New Data Indicator (NDI).

* * * * *